US012603489B2

(12) United States Patent
Martin et al.

(10) Patent No.: US 12,603,489 B2
(45) Date of Patent: Apr. 14, 2026

(54) FAULT CURRENT TOLERANT SWITCHING MECHANISM FOR A REMOTELY OPERATED CIRCUIT INTERRUPTER

(71) Applicant: EATON INTELLIGENT POWER LIMITED, Dublin (IE)

(72) Inventors: Michael Thomas Martin, Mars, PA (US); Theodore James Miller, McDonald, PA (US); David Walter Brooking, New Galilee, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 295 days.

(21) Appl. No.: 18/237,216

(22) Filed: Aug. 23, 2023

(65) Prior Publication Data

US 2025/0070544 A1    Feb. 27, 2025

(51) Int. Cl.
| | |
|---|---|
| *H02H 3/08* | (2006.01) |
| *H01H 47/22* | (2006.01) |
| *H01H 50/18* | (2006.01) |
| *H01H 50/54* | (2006.01) |
| *H02H 1/00* | (2006.01) |

(52) U.S. Cl.
CPC .............. *H02H 3/08* (2013.01); *H01H 47/22* (2013.01); *H01H 50/18* (2013.01); *H01H 50/54* (2013.01); *H02H 1/0007* (2013.01)

(58) Field of Classification Search
CPC ....... H01H 2071/665; H01H 2083/203; H01H 83/20; H01H 83/226; H01H 89/06; H01H 2071/124; H01H 47/22; H01H 50/18;

H01H 50/54; H01H 89/08; H02J 13/00004; H02J 13/00022; H02J 13/00036; H02J 13/0004; H02H 1/0007; H02H 3/08
See application file for complete search history.

(56) References Cited

U.S. PATENT DOCUMENTS 5,173,673 A * 12/1992 Weigand ................ H01H 83/02
361/42
6,014,297 A * 1/2000 Clarey ................. H02H 1/0015
361/45

(Continued)

*Primary Examiner* — Danny Nguyen
*Assistant Examiner* — Nicolas Bellido
(74) *Attorney, Agent, or Firm* — Eckert Seamans Cherin & Mellott, LLC

(57) ABSTRACT

A remotely operated circuit interrupter includes: primary separable contacts coupled to an operating mechanism and a thermal-magnetic trip device structured to interrupt current from flowing to loads by opening the primary separable contacts during a fault event; and a fault current tolerant secondary switching mechanism including secondary separable contacts coupled to the primary separable contacts in series, Rogowski coils, a di/dt measurement circuit, a secondary solenoid driver, the Rogowski coils structured to continuously sense a rate (di/dt) of change of load current, the di/dt measurement circuit structured to receive a signal including the sensed di/dt, determine that the sensed di/dt has reached or exceeded a threshold current rate of change, and output a fault signal to the secondary solenoid driver based on the determination, the secondary solenoid driver structured to actuate the solenoids to fully open the secondary separable contacts using arc voltages of the primary and secondary contacts.

18 Claims, 13 Drawing Sheets

(56)          References Cited

U.S. PATENT DOCUMENTS

| | | | | |
|---|---|---|---|---|
| 6,477,022 B1* | 11/2002 | Ennis | ..................... | H01H 89/06 |
| | | | | 361/42 |
| 2011/0050154 A1* | 3/2011 | Farr | ...................... | H02H 3/006 |
| | | | | 361/30 |
| 2012/0275071 A1* | 11/2012 | Gutierrez | ............. | H02H 1/0015 |
| | | | | 361/42 |
| 2015/0179363 A1* | 6/2015 | Wiersch | ............... | H01H 71/462 |
| | | | | 200/51 R |
| 2016/0301200 A1* | 10/2016 | Niehoff | .................... | H02H 3/10 |
| 2022/0328273 A1* | 10/2022 | Vaghasiya | ......... | H02J 13/00004 |

* cited by examiner

FAULT CURRENT TOLERANT SWITCHING MECHANISM FOR A REMOTELY OPERATED CIRCUIT INTERRUPTER

FIELD OF THE INVENTION

The disclosed concept relates generally to an apparatus, system and method of circuit protection using a circuit interrupter in an electrical network, and in particular interrupting current by tripping primary and secondary separable contacts in series in a remotely operated circuit interrupter during a high fault current event.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Two pole circuit breakers typically have a pair of primary separable contacts opened and closed by a spring biased operating mechanism. A thermal magnetic trip device actuates in response to persistent overcurrent conditions and short circuits. Some circuit breakers are remotely operable to allow an end user to perform, e.g., load shedding or load management. Such remote circuit breakers may include secondary separable contacts in series with the primary separable contacts. Typically, the primary separable contacts interrupt the overcurrent, while the secondary separable contacts perform secondary switching operations. As such, an end user may perform load control or load shedding by remotely opening or closing the secondary separable contacts. The secondary separable contacts are controlled by a solenoid(s) including a plunger and a solenoid coil(s) (e.g., without limitation, one open/close solenoid coil or one open solenoid coil with one close solenoid coil). To close the secondary separable contacts, the solenoid coil is energized to push the plunger downwardly and close the secondary separable contacts. When a load shedding is desired, the solenoid open coil is energized to lift the plunger against a spring force and open the secondary separable contacts. The contacts are held in the open position via a permanent magnet within the solenoid. To re-close the secondary separable contacts the close solenoid coil is energized to overcome the permanent magnet force and close the secondary separable contacts through a spring force.

The secondary separable contacts are required to withstand over 100,000 open and close operations at rated current and voltage and also withstand let-through energy of a high interruption fault current event (e.g., without limitation, a short circuit). However, contact material (e.g., without limitation, silver cadmium oxide) that is preferred for such a high number of switching operations is prone to contact welding during a high interruption fault current event. During a high interruption fault current event, the magnetic forces cause the secondary contacts to separate as the primary separable contacts are tripped open. While the operating mechanism allows the primary separable contacts to open fully and keep them open until they are manually reset or closed, there is no such operating mechanism to fully open and keep the secondary separable contacts open until the fault is cleared. As such, the secondary separable contacts are open partially or with a small gap therebetween, with an arc remaining between them. The contacts are subject to damage or tack-welding while floating or upon reclosing. In order to prevent such damage or tack-welding, conventional remotely operated circuit breakers utilize a clamping mechanism (e.g., without limitation, a slot motor) to keep the secondary separable contacts closed during a fault event. However, the clamping slot motors have shown to fail to keep the secondary separable contacts closed, and thus expose the latter to contact welding. Further, the clamping slot motors tend to be insufficient or ineffective at breaker ratings greater than 50 A. At a higher breaker rating (e.g., without limitation, 60 A), a bigger gauge wire is used, and thus the let-through energy of the fault current becomes greater. As such, the clamping slot motor needs to negate a larger constriction force while the magnetic effect is limited for the secondary separable contacts to withstand the larger constriction force, thereby resulting in contact welding and damaged secondary separable contacts at the higher breaker rating.

There is room for improvement in remotely operated circuit interrupters.

There is a need for an improved protection mechanism for the secondary separable contacts in remotely operated circuit interrupters in high interruption fault current events.

SUMMARY OF THE INVENTION

These needs, and others, are met by embodiments of the disclosed concept in which a remotely operated circuit interrupter is provided. The remotely operated circuit interrupter is structured to be connected between a power source and one or more loads. It includes: primary separable contacts coupled to an operating mechanism and a thermal-magnetic trip device structured to interrupt current from flowing to the one or more loads by opening the primary separable contacts during a fault event; and a fault current tolerant secondary switching mechanism that includes secondary separable contacts coupled to the primary separable contacts in series, one or more Rogowski coils structured to continuously sense a rate (di/dt) of change of load current, a di/dt measurement circuit, a secondary solenoid driver and one or more solenoids, the di/dt measurement circuit being coupled to the one or more Rogowski coils and structured to receive a signal including the sensed di/dt, determine that the sensed di/dt has reached or exceeded a threshold current rate of change, and output a fault signal to the secondary solenoid driver based on the determination, the secondary solenoid driver being coupled to the coupled to the di/dt measurement circuit and one or more solenoids, the secondary solenoid driver being structured to actuate the one or more solenoids to fully open the secondary separable contacts based on the fault signal using series arc voltages created by the primary separable contacts and the secondary separable contacts.

Another embodiment provides a method of interrupting current flowing in a remotely operated circuit breaker structured to be connected between a power source and one or more loads. The remotely operated circuit breaker has primary separable contacts and a fault current tolerant secondary switching mechanism including secondary separable contacts, one or more Rogowski coils, a di/dt measurement circuit, a secondary solenoid driver and one or more solenoids. The method includes detecting a fault, opening the primary separable contacts based on the detection of the fault, continuously sensing a rate (di/dt) of change of load current by the one or more Rogowski coils and determining, by the di/dt measurement circuit, that the di/dt has reached or exceeded a threshold current rate of change, outputting, by the di/dt measurement circuit, a fault signal to the secondary solenoid driver based on the determination, and actuating, by the secondary solenoid driver, the one or more solenoids to fully open the secondary separable contacts based on the fault signal using series arc voltages created by the primary separable contacts and the secondary separable contacts.

BRIEF DESCRIPTION OF THE DRAWINGS

A full understanding of the invention can be gained from the following description of the preferred embodiments when read in conjunction with the accompanying drawings in which:

FIG. 8A is an internal view of an exemplary remotely operated circuit interrupter and FIG. 8B is a cross-sectional top view of the remotely operated circuit interrupter transversely cut through along the line A-A of FIG. 8A;

DETAILED DESCRIPTION OF THE INVENTION

Figure 1:
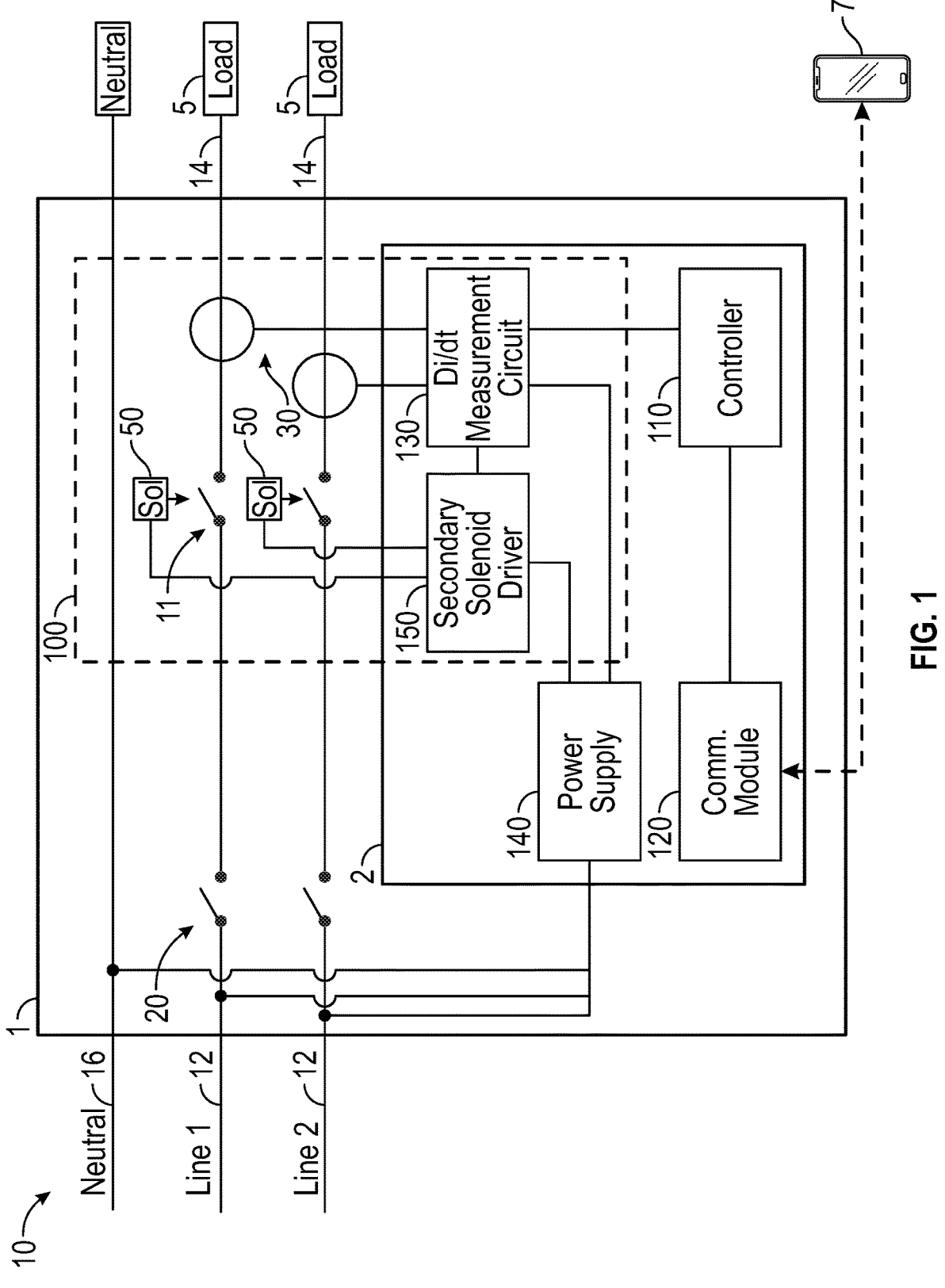
FIG. 1 is a diagram of a power distribution system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 is a diagram of a power distribution system 10 in accordance with a non-limiting, example embodiment of the disclosed concept. The power distribution system 10 includes a circuit interrupter (e.g., without limitation, a 2-pole remotely operated circuit breaker) 1, a power source, and one or more loads 5. The circuit interrupter 1 is structured to be electrically connected between the power source (e.g., without limitation, AC utility providing 120/240V AC line voltage at 60 Hz) via the LINE conductors 12 and loads 5 via the LOAD conductors 14. The circuit interrupter 1 is structured to trip open or switch open to interrupt current flowing to the loads 5 in case of a fault event (e.g., without limitation, an overcurrent condition, a short circuit, etc.) to protect the loads 5, circuitry associated with the loads 5, as well as the components within the circuit interrupter 1. The circuit interrupter 1 may be communicatively coupled to a mobile device 7 of an end user to turn on or off one or more loads 5 remotely during normal operation.

Figure 2A:
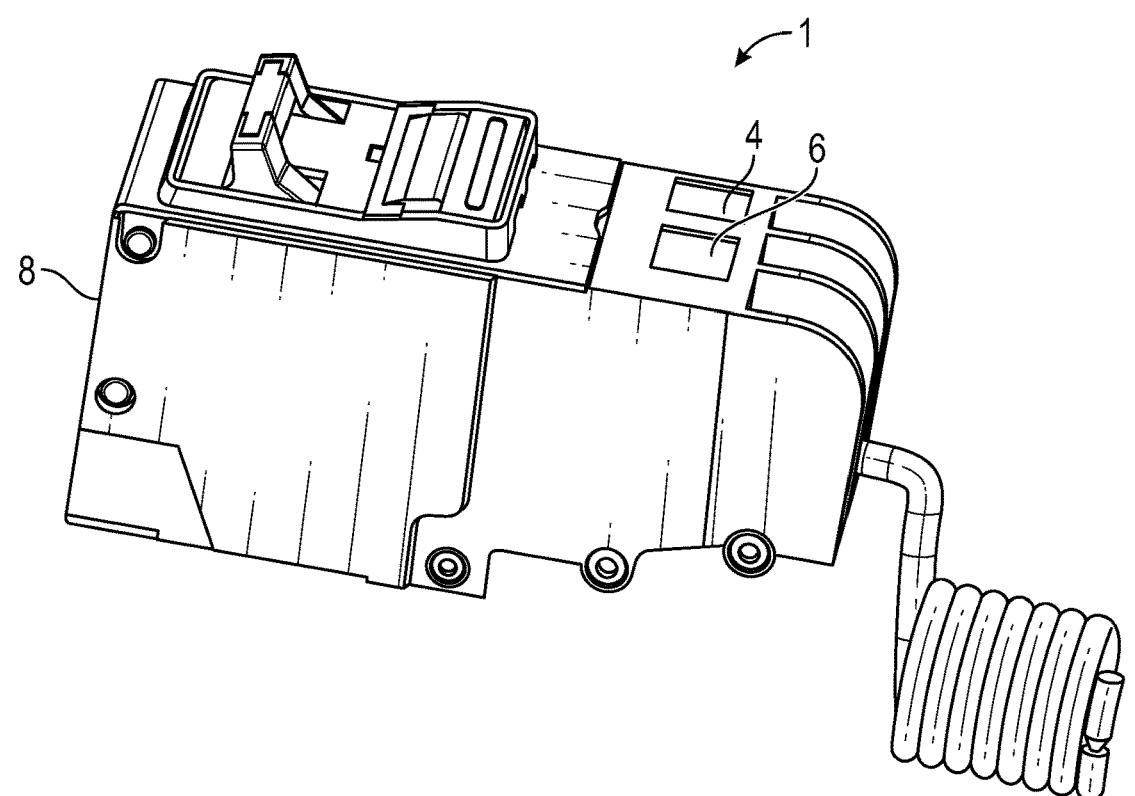
FIGS. 2A-C illustrate perspective top views of an exemplary remotely operated circuit interrupter in accordance with an example embodiment of the disclosed concept.

The circuit interrupter 1 may be a remotely operated 2-pole circuit interrupter, e.g., without limitation, for 240V application. As shown in FIGS. 2A-3, the remotely operated circuit interrupter 1 includes a housing 8, two laterally spaced-apart poles 4, 6 and a printed circuit board (PCB) 2 disposed therebetween. The PCB 2 is disposed in between the two-poles 4, 6 of the circuit interrupter 1 as shown in FIG. 2C such that an additional separate frame (e.g., without limitation, a third pole or third pole frame) structured to house the electrical components is not needed. As such, the remotely operated circuit interrupter 1 dispenses with the third-pole or third-pole frame to house the electrical components therein as required by the conventional remotely-operated circuit interrupters. In some examples, the PCB2 may be disposed within an additional pole or pole frame (e.g., a third pole or third pole frame).

The printed circuit board 2 includes electrical components of the remotely operated circuit interrupter 1, e.g., without limitation, a controller 110, a communication module 120, a di/dt measurement circuit 130, a power supply 140 and a secondary solenoid driver 150. The controller 110 is coupled to the communication module 120, the di/dt measurement circuit 130, the power supply 140 and the secondary solenoid driver 150. It is structured to monitor and control operations of all electronical components within the circuit interrupter 1. It may be a microprocessor, a microcontroller, or some other suitable processing device or circuitry, and include memory. The memory may include random access memory and read only memory and store computer-readable, computer-executable software and/or firmware including codes or instructions which, when executed, cause the controller 110 to perform various functions including causing the secondary solenoid driver 150 to actuate the solenoid 50 to open or close the secondary separable contacts 11 based at least in part on a user input received via the communication module 120 in a wired and/or wireless connection. The communication module 120 may be a transceiver that may communicate bi-directionally, via one or more antennas (not shown) via wireless links. The antennas may be capable of transmitting or receiving one or more wireless transmissions, e.g., from/to the communication module 120, the user device 7, etc. The power supply 140 is coupled to the controller 110 and other electrical components of the circuit interrupter 1 and structured to supply power to the electrical components therein. In some examples, the PCB 2 may include an electric trip unit structured to interrupt current flowing to the load 5 in an event of a fault by causing the operating mechanism 40 to trip open the primary separable contacts 20.

Figures 6A, 6B:
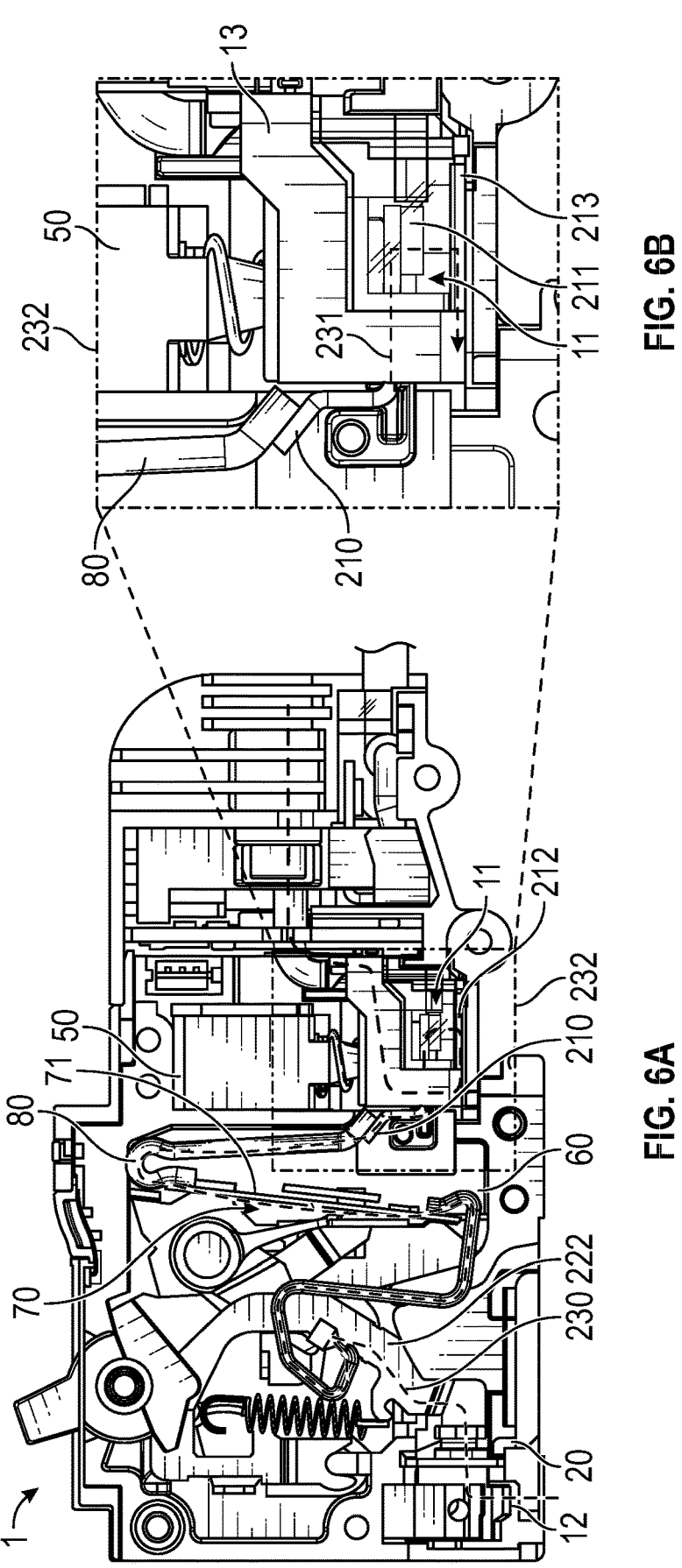
FIGS. 6A-B illustrate a current path and a reverse current loop within an exemplary remotely operated circuit interrupter during a high interruption fault current event in accordance with an example embodiment of the disclosed concept.

Within the housing 8, the remotely operated circuit interrupter 1 also includes primary separable contacts 20 coupled to an operating mechanism 40 and a thermal-magnetic trip device 70 (as shown in FIGS. 3 and 6A-B) structured to interrupt the current from flowing to the loads 5 by opening the primary separable contacts 20 upon detecting a fault event. It also includes a fault current tolerant secondary switching mechanism 100, which includes secondary separable contacts 11, Rogowski coils 30, a di/dt measurement circuit 130, a secondary solenoid driver 150 and solenoids 50. As shown in FIGS. 3 and 6A-B, the secondary separable contacts 11 are coupled to the primary separable contacts 20 in series and include a secondary stationary contact 113 and a secondary movable contact 112 coupled to a secondary stationary arm 212 and a secondary moving arm 210, respectively.

The Rogowski coils 30 are helically wrapped around a non-ferromagnetic core and coupled to the di/dt measurement circuit 130 at one end. The Rogowski coils 30 are structured to continuously sense a rate (di/dt) of change in load current to the di/dt measurement circuit 130. The di/dt measurement circuit 130 is structured to receive the di/dt signal from the Rogowski coils 30, determine if the di/dt signal has reached or exceeded a threshold current rate of change (e.g., without limitation, 1,400 A peak at 60 Hz), and output a fault signal to the secondary solenoid driver 150 upon determining that the di/dt signal has reached or exceeded a threshold current rate of change. The sensed di/dt signal of each phase is filtered so that the remotely operated circuit interrupter 1 does not react to extremely short duration inrush currents that occur with normal circuit breaker loads. As such, the di/dt measurement circuit 130 activates the secondary solenoid driver 150 to fully open the secondary separable contacts 11 only upon the determination that the di/d/signal has reached or exceeded the threshold current rate of change. The threshold current rate of change is a current level at 60 Hz at which the di/dt measurement circuit 130 begins to drive the solenoids 50 to open the secondary separable contacts 11.

The secondary solenoid driver 150 is coupled to the di/dt measurement circuit 130 and the solenoids 50. It is structured to receive a fault signal from the di/dt measurement circuit 130 and actuate the solenoids to fully open the secondary separable contacts 11 based on the fault signal. The solenoids 50 are magnetically latchable solenoids, and opens or closes the secondary separable contacts 11 based on a driver output signal (e.g., without limitation, the fault signal) received from the secondary solenoid driver 150. The solenoids 50 each include a plunger, a solenoid coil and a permanent magnet. Upon actuation, the solenoid coils of the solenoids 50 are energized to lift or magnetically release the plunger to open or close the secondary separable contacts 11. During the high interruption fault current event, the solenoid coil is energized by the series arc voltage and fully opens the secondary separable contacts 11. Then, the permanent magnets hold the secondary separable contacts 11 open so as to overcome the spring force until the fault has been cleared.

Thus, the remotely operated circuit interrupter 1 utilizes the novel fault current tolerant secondary switching mechanism 100 to prevent contact welding and destruction of the circuit interrupter 1 during high interruption fault current events. The fault current tolerant secondary switching mechanism 100 is novel in that it advantageously causes the secondary separable contacts 11 to fully open and remain open until the fault has been cleared. This is in direct contrast to the conventional remotely operated circuit interrupters that seek to prevent their secondary separable contacts from opening and keep them closed during a fault event in order to avoid tack-welding or other damages thereto. That is, the fault current tolerant secondary switching mechanism 100 protects the secondary separable contacts 11 from tack-welding or damages by allowing (in fact, causing or forcing) the secondary separable contacts to fully open and stay open until the fault has been cleared, not by keeping the secondary separable contacts closed as the conventional remotely operated circuit interrupters do. By forcing the secondary separable contacts 11 to fully open and remain fully open until the fault has been cleared, the fault current tolerant secondary switching mechanism 100 effectively reduces or minimizes the amount of arcing to which the secondary separable contacts 11 are exposed. By allowing the secondary separable contacts 11 to fully open, cool and resolidify, the fault current tolerant secondary switching mechanism 100 prevents contact welding under high interruption fault current events, thereby effectively and reliably protecting the secondary separable contacts 11 as well as other parts of the remotely operated circuit interrupter 1.

Further, in stark contrast with the conventional remotely operated circuit interrupters that prevent creation of an arc, the fault current tolerant secondary switching mechanism 100 utilizes the very arc to fully open the secondary separable contacts 11 and keep them open. Two arcs in series occur when the primary and secondary separable contacts 20, 11 open. Each arcing separable contact 20, 11 acts as a resistor in the circuit, creating a voltage that can be used to drive the solenoids. As mentioned previously, the conventional remotely operated circuit interrupters only have the primary separable contacts opening and keep the secondary separable contacts closed during a fault event. Thus, the conventional remotely operated circuit interrupters have less overall resistance in the circuit as compared to that of the remotely operated circuit interrupter 1 of the disclosed concept. Typically, the conventional remotely operated circuit interrupters have peak circuit voltages of approximately 250V and peak let-through currents of approximately 7.5 kA. By adding two more arcs to the circuit, the remotely operated circuit interrupter 1 of the disclosed concept has significantly higher peak circuit voltages (e.g., without limitation, above 330V) and lower peak let-through currents (e.g., without limitation, 5.7 kA) than those of the conventional remotely operated circuit interrupters. As such, the two arcs in series add to the peak circuit voltage and helps to ensure that the secondary contacts are fully open past the float point.

Figure 4:
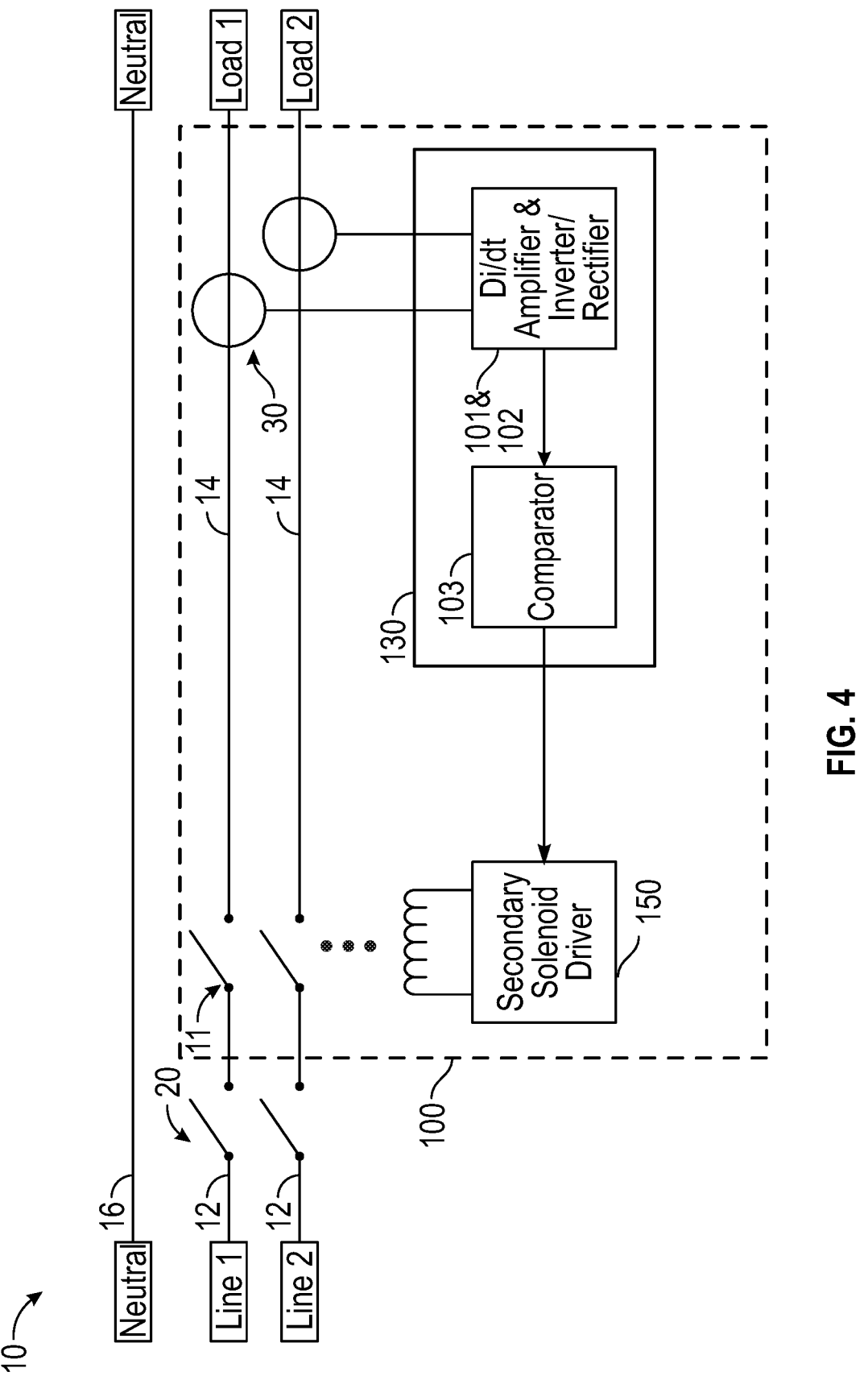
FIG. 4 is a partial diagram of a fault current tolerant secondary switching mechanism in an exemplary remotely operated circuit interrupter in accordance with an example embodiment of the disclosed concept.
Figure 5:
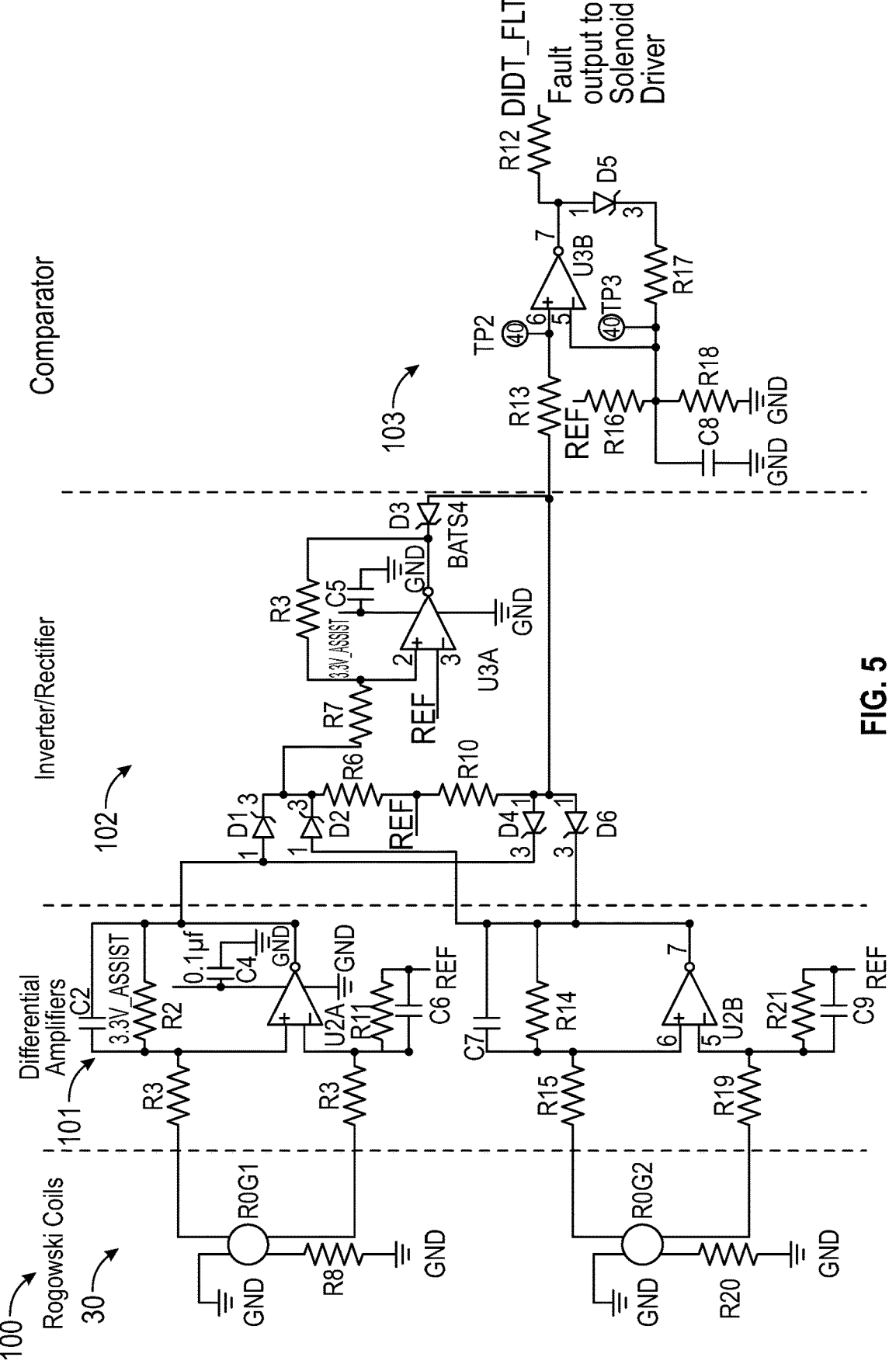
FIG. 5 is a partial schematic of a fault current tolerant secondary switching mechanism in an exemplary remotely operated circuit interrupter in accordance with an example embodiment of the disclosed concept.

In addition, the fault current tolerant secondary switching mechanism 100 is also novel in that it includes a di/dt sensing and measurement mechanism dedicated to fully opening the secondary separable contacts 11 during a high interruption fault current event. As shown in FIGS. 1, 4 and 5, the fault current tolerant secondary switching mechanism 100 includes the separable secondary contacts 11, Rogowski coils 30, the di/dt measurement circuit 130, the secondary solenoid driver 150, and the solenoids 50. Rogowski coils 30 are structured to continuously sense the di/dt of the load current in each pole and transmit signals including the sensed di/dt to respective di/dt amplifiers 101. The di/dt amplifiers 101 then transmit the amplified di/dt signals to the inverter/rectifier for signal conditioning and/or filtering. The comparator 103 determines if the di/dt has reached or exceeded the threshold current rate of change and outputs a fault signal to the secondary solenoid driver 150 based on the determination that di/dt has reached or exceeded the threshold current rate of change. That is, the di/dt measurement circuit 130 ensures that the circuit interrupter 1 does not react to extremely short duration inrush currents that occur with normal circuit breaker loads by filtering the sensed di/dt of each phase. Further, the fault current tolerant secondary switching mechanism 100 advantageously utilizes the Rogowski coils 30 and the sensed di/dt for a novel use, i.e., assisting with fully opening the secondary separable contacts 11.

Furthermore, the fault current tolerant secondary switching mechanism 100 further protects the secondary separable contacts 11 and the remotely operated circuit interrupter 1 by limiting the peak let-through (fault) current that the secondary separable contacts 11 and other components of the remotely operated circuit interrupter 1 need to withstand during high interruption fault current events. As mentioned previously, the two arcs in series per pole provide an increased resistance from the LINE conductor 12 to the LOAD conductor 14 of the remotely operated circuit interrupter 1 as compared to one arc per pole formed by a single set of contacts (i.e., the primary separable contacts) as in the conventional remotely operated circuit interrupters. As the resistance is increased, the total voltage of the LINE-to-LOAD voltage also increases such that the total peak voltage becomes greater than the available voltage from the power source. The peak let-through current then decreases. As such, the fault current tolerant secondary switching mechanism 100 provides current limiting (limiting the fault current) by increasing the arc voltage as a result of two arcs in series per pole, as compared to the voltage resulting from one arc per pole in the conventional remotely operated circuit interrupters that open primary separable contacts without also opening secondary separable contacts therein. Such current limiting effect decreases the energy which the remotely operated circuit interrupter 1 needs to react to and withstand from the energy that the conventional remotely operated circuit interrupters need to react to and withstand while they attempt to hold the secondary separable contacts closed. The energy that the let-through current creates in a circuit interrupter is proportional to $I^2t$, where I is the fault current and t is time. If too much energy is built up in the remotely operated circuit interrupter 1, the circuit interrupter 1 will run a risk of fusing a conductor in the circuit or destroying the housing 8, and thus fail. The time component t for a high interruption fault current event will not change for a given fault event between the conventional remotely operated circuit interrupters and the inventive remotely operated circuit interrupter 1. However, the reduction in the let-through current I has a non-linear reduction in energy that the remotely operated circuit interrupter 1 encounters. This leads to a significantly less risk of conductor fusing or failed housings as compared to such risk of the conventional remotely operated circuit interrupters. Thus, the current limiting prevents, e.g., without limitation, tack-welding of the secondary separable contacts 11, fusing of one or more conductors within the circuit interrupter 1 and destroying the housing of the circuit interrupter 1.

Figure 7:
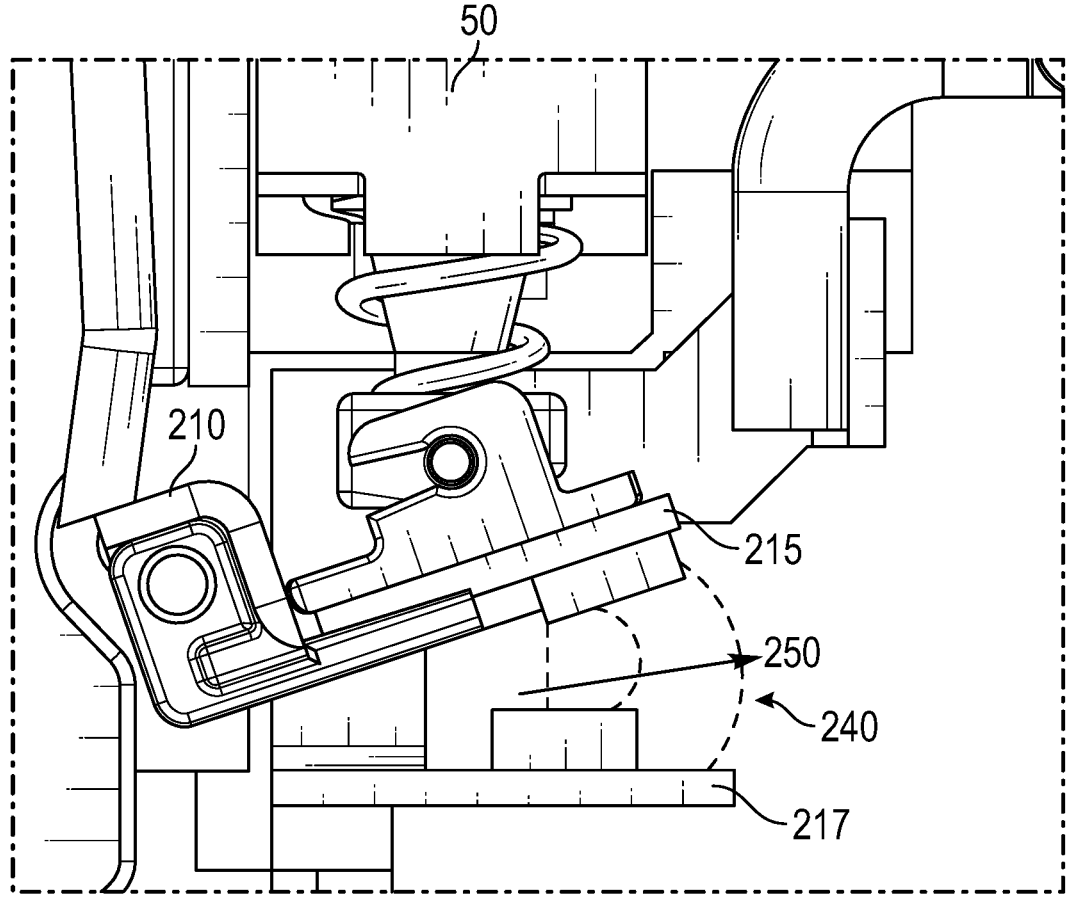
FIG. 7 illustrates arc movement associated with opening of secondary separable contacts in an exemplary remotely operated circuit breaker in accordance with an example embodiment of the disclosed concept.

Additionally, the fault current tolerant secondary switching mechanism 100 utilizes a reverse current loop to assist with fully opening the secondary separable contacts 11. Typically, the current flows from the power source, the line conductor, the primary stationary arm, the primary separable contacts, the primary moving arm, a bimetal strip of the thermal-magnetic trip device, a flexible conductor, the secondary moving arm, the secondary separable contacts, the secondary stationary arm, the load conductor and then to the loads. In the remotely operated circuit interrupter 1, the terminals 211, 213 for the secondary moving arm 210 and the secondary stationary arm 212 are structured to form a reverse current loop as the current passes the secondary separable contacts 11 into the loads 5. As shown in FIGS. 3 and 6A-B, the secondary moving arm 210 is coupled to the second flexible conductor 80 at one end and the secondary moving contact 112 at the other end. The secondary stationary arm 212 is coupled to the secondary stationary contact 113 at one end, extends inwardly and is connected to a load conductor 13 at the other end. Further, the terminals 211, 213 are structured to run parallel to each other when the secondary separable contacts 11 are closed. Thus, the current in the remotely operated circuit interrupter 1 flows in the following current path 230: from the LINE conductor 12, the primary stationary arm 220, the primary separable contacts 20, the primary moving arm 222, a first flexible conductor 60, the bimetal strip 71 of the thermal-magnetic trip device 70, a second flexible conductor 80, the secondary moving arm 210, the secondary separable contacts 11, the secondary stationary arm 212, a conductor 13 and then to the load 5. That is, the current flows outwardly via the secondary moving arm 210, and upon passing through the secondary separable contacts 11, the current reverses its path and flows inwardly away from the secondary separable contacts 11 into the conductor 13. When the current reverse its path, the current flows in two parallel and opposite directions simultaneously, making a reverse current loop 231 until it flows outwardly to the loads 5. As such, the reverse current loop 231 includes a first current portion flowing outwardly via the terminal 211 of the secondary moving arm 210 and a second current portion flowing in parallel and opposite the first current portion via the terminal 213 of the secondary stationary arm 212 upon passing the secondary separable contacts 11. During a high interruption fault current event, the reverse current loop 231 adds to the separation velocity of the secondary separable contacts 11 that is initiated by constriction force between the contacts. That is, the parallel and opposite flows of the current act to repel the secondary separable contacts 11 away from each other. The secondary separable contacts 11 then separate and create a small gap therebetween upon separation, and float. Simultaneously, the dedicated di/dt measurement circuit 130 (specifically, the secondary solenoid driver 150) drives the fault current through the solenoid coil and causes the solenoids 50 to fully open the secondary separable contacts 11 past the float point. Throughout the secondary contact opening, the reverse current loop 231 creates a magnetic force that propels outwardly the arc 240 created from opening the secondary separable contacts 11 toward outer tips 215, 217 of the secondary moving and stationary arm terminals 211, 213 as shown in FIG. 7. The arc 240 then elongates further as it moves towards the outer tips 215, 217 in a direction shown by arrow 250. The elongation of the arc increases the arc resistance further, thereby driving up the arc voltage, which then energizes the solenoid coil to fully open the secondary separable contacts 11. As such, the reverse current loop 231 contributes or assists in fully opening the secondary separable contacts 11, and thus provides further protection for the secondary separable contacts 11.

Figure 2B:
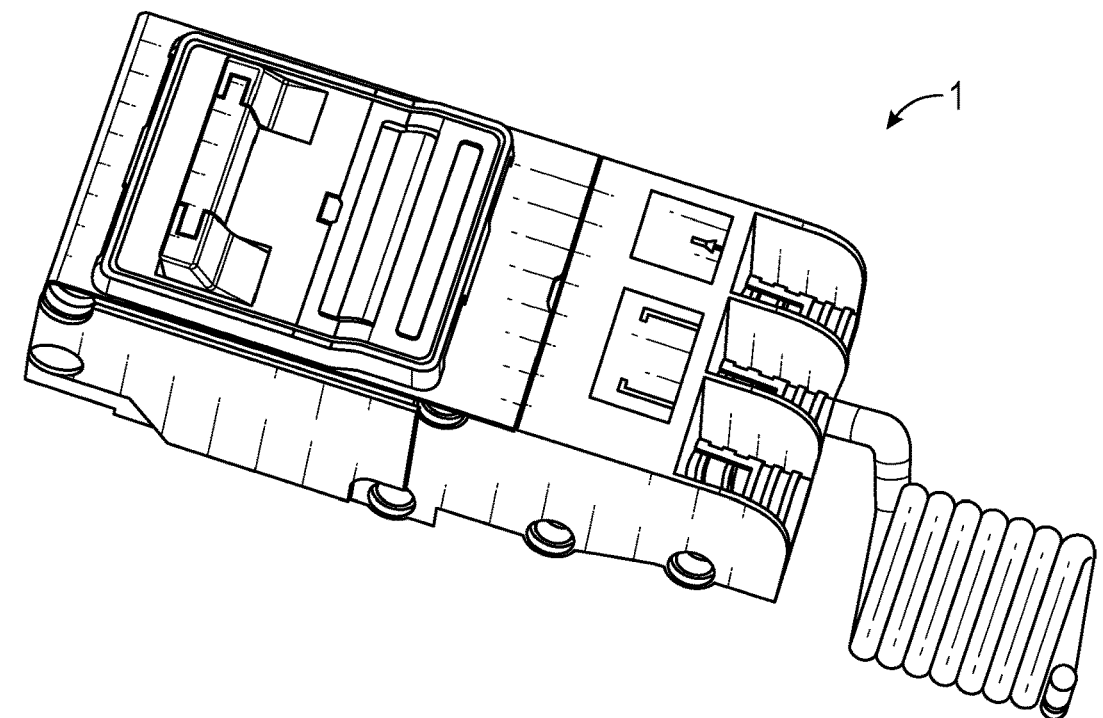
Figure 2C:
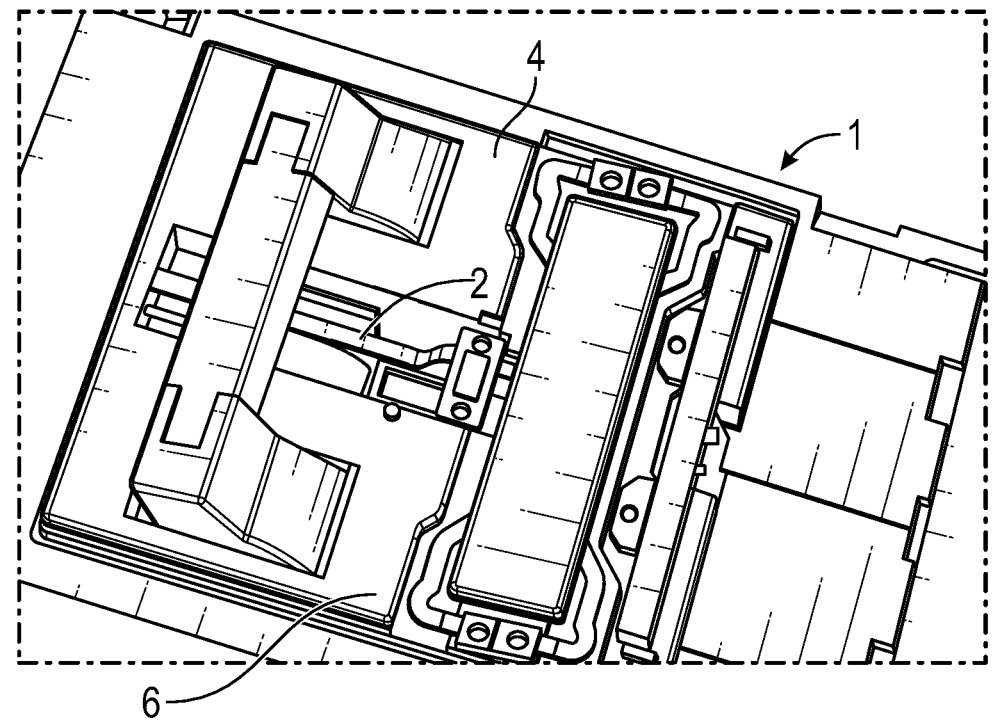
Figure 3:
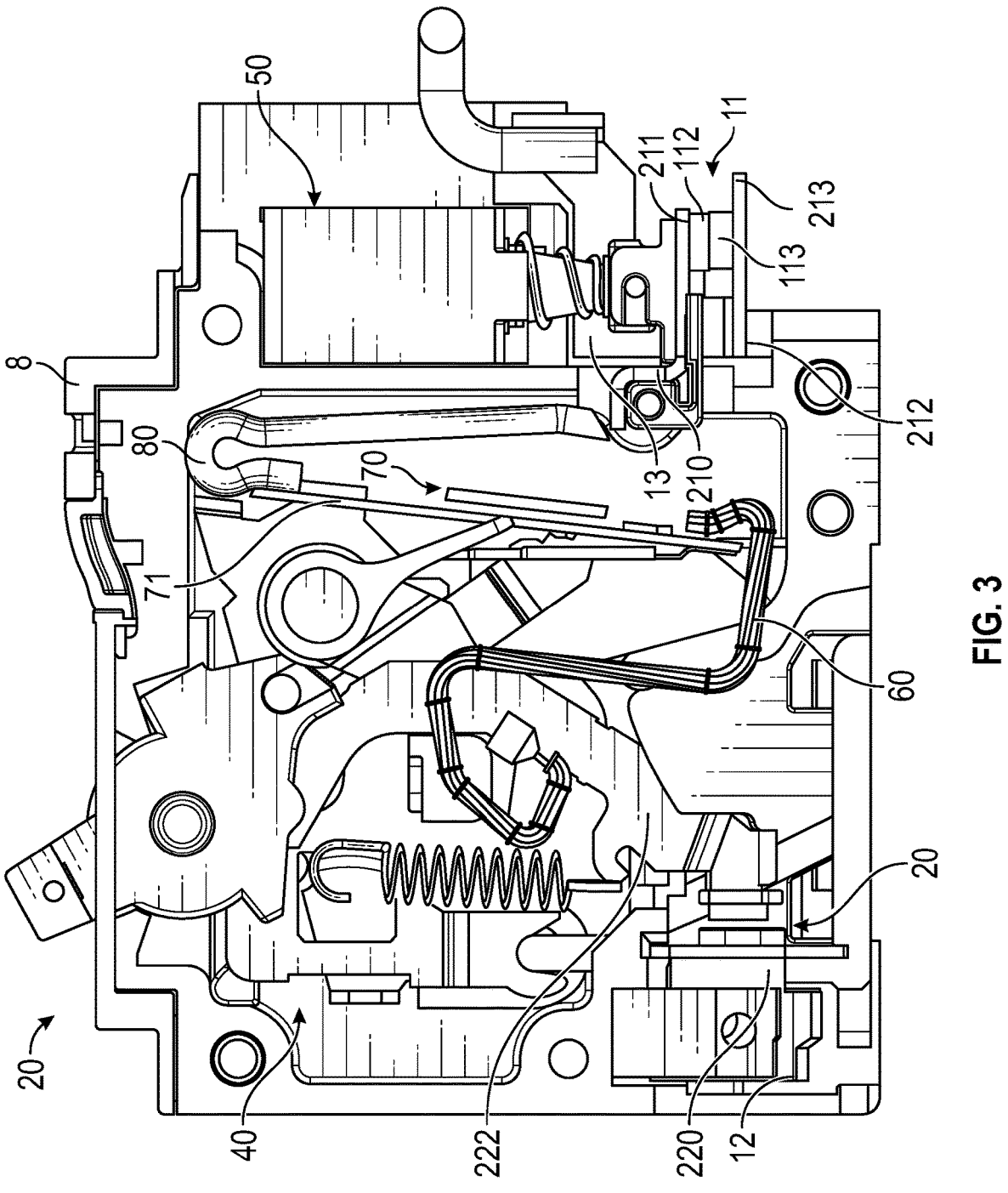
FIG. 3 is an internal view of an exemplary remotely operated circuit interrupter in accordance with an example embodiment of the disclosed concept.

FIGS. 2A-C illustrate top perspective views of an exemplary 2-pole remotely operated circuit interrupter 1 according to a non-limiting, example embodiment of the disclosed concept. The 2-pole circuit interrupter 1 may be used in 240V application. Typically, a 240V remotely operated circuit interrupter has 2-poles and requires a third pole or third pole frame to house the electrical components of the circuit interrupter. The remotely operated circuit interrupter 1 includes a housing 8, two laterally spaced-apart poles 4, 6, and a printed circuit board disposed therebetween, the printed circuit board including electrical components of the remotely operated circuit interrupter 1. As such, the remotely operated circuit interrupter 1 dispenses with an additional housing (e.g., without limitation, a third pole or third pole frame) for housing the electrical components, thereby minimizing the required installation space and manufacturing costs. Further, despite its reduced size, the remotely operated circuit interrupter 1 has a higher breaker rating (e.g., without limitation, 60 A) than the breaker rating (e.g., without limitation, 50 A) of the conventional remotely operated circuit interrupters, and thus is capable of providing protection of larger and more critical loads than the conventional 2-pole remotely operated circuit interrupters are.

FIG. 3 is an internal view of the remotely operated circuit interrupter of FIGS. 1-2C according to a non-limiting, example embodiment of the disclosed concept. Within the housing 8, the remotely operated circuit interrupter 1 includes the LINE conductor 12, a primary stationary arm 220, primary separable contacts 20, a primary moving arm 222, an operating mechanism 40, a thermal-magnetic trip device 70 including a bimetal strip 71, first and second flexible conductors 60, 80, a secondary moving arm 210, the secondary separable contacts 11, a secondary stationary arm 212, and the solenoid 50. During the normal operation, the primary separable contacts 20 are closed and the user may open or close the secondary separable contacts 11 via a wireless or wired connection from a remote user device 7. When a high interruption fault current event (e.g., a short circuit) is detected, the operating mechanism 40 and the thermal-magnetic trip device 70 trip the primary separable contacts 20 open. The fault current tolerant secondary switching mechanism 100 continuously senses the rate (di/dt) of change of the load current using the Rogowski coils 30, determines if the sensed di/dt has reached or exceeded a threshold current rate of change (e.g., without limitation, 1,400 A peak at 60 Hz), and opens the secondary separable contacts 11 via the secondary solenoid driver 150 and the solenoid 50 using series arc voltages created from separating of the primary and secondary separable contacts 20, 11.

FIGS. 4 and 5 illustrate partial diagram and schematic of an exemplary fault current tolerant secondary switching mechanism 100 of FIG. 1. FIG. 4 shows a partial diagram of the fault current tolerant secondary switching mechanism 100 of an exemplary two-pole remotely operated circuit interrupter 1 in a power distribution system 10. FIG. 5 shows a partial schematic of the fault current tolerant secondary switching mechanism 100, which includes the secondary separable contacts 11, Rogowski coils 30, the di/dt measurement circuit 130, the secondary solenoid driver 150, and the solenoids 50 (not shown). The di/dt measurement circuit 130 includes di/dt amplifiers 101, an inverter/rectifier 102 and a comparator 103. The di/dt measurement circuit 130 receives a signal including the sensed di/dt from the Rogowski coils 30, amplifies the sensed di/dt using the di/dt signal amplifiers 101, conditions and/or filters the amplified di/dt signal, determines if the di/dt has reached or exceeded a threshold current rate of change (e.g., without limitation, 1,400 A peak at 60 Hz) using the comparator 103, outputs a fault signal to the secondary solenoid driver 150 upon determining that the di/dt has reached or exceeded the threshold current rate of change. The secondary solenoid driver 150 in turn actuates the solenoids 50 to fully open the secondary separable contacts 11 based on the fault signal using series arc voltages created from separating of the primary and secondary separable contacts 20, 11. The solenoids 50 (specifically, permanent magnets therein) then keep the secondary separable contacts 11 to remain open until the fault has been cleared.

FIGS. 6A-B illustrate a current path 230 including a reverse current loop 231 within an exemplary remotely operated circuit interrupter 1 according to a non-limiting, example embodiment of the disclosed concept. The current flows in the following current path 230 in the remotely operated circuit interrupter 1: the power source 3→the primary separable contacts 20→the primary moving arm 222→the first flexible conductor 60→the bimetal strip 71→the second flexible conductor 80→the secondary moving arm 210→the secondary separable contacts 11→the secondary stationary arm 212→a conductor 13→the loads 5. FIG. 6B shows an enlarged view of area 232 in which the reverse current loop 231 occurs.

FIG. 7 illustrates an arc 240 created from separating of the secondary separable contacts 11 and the outward movement of the arc 240 based on the reverse current loop 231 according to a non-limiting, example embodiment of the disclosed concept. As a result of a fault, the secondary separable contacts 11 separate and an arc 240 is formed. Upon the current passing through the secondary separable contacts 11, the current reverses its path and flows in two parallel and opposite directions simultaneously, causing the secondary separable contacts 11 to repel from each other and also creating a magnetic force that propels the arc 240 outwardly as shown by the arrow 250. The elongated arc 240 then drives up the arc resistance further, thereby driving up the arc voltage further and further ensuring fully opening of the secondary separable contacts 11.

Figure 8A:
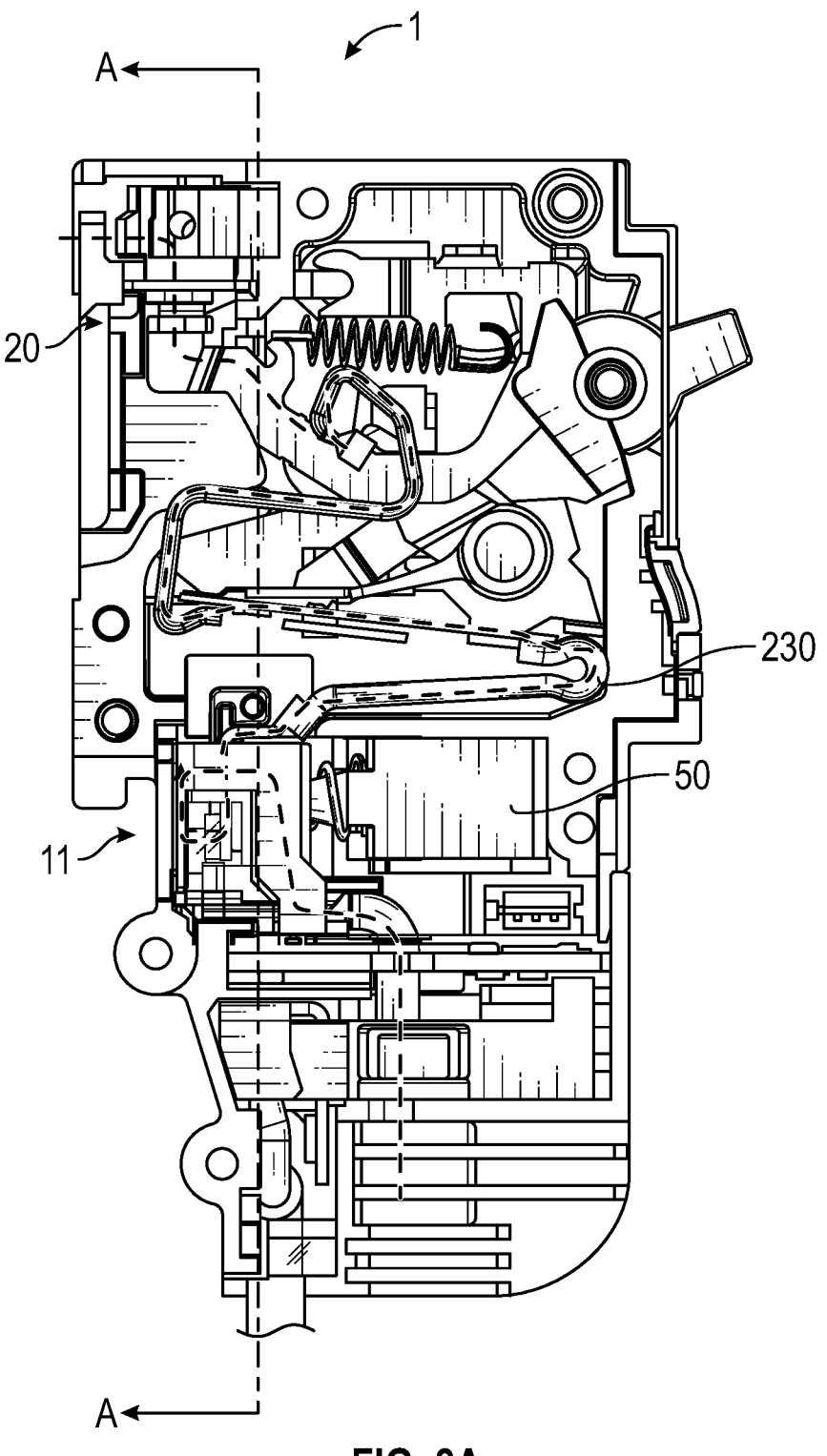
FIGS. 8A-B illustrate a wiring diagram and equivalent circuit during a high interrupt fault current testing in accordance with an example embodiment of the disclosed concept.
Figure 8B:
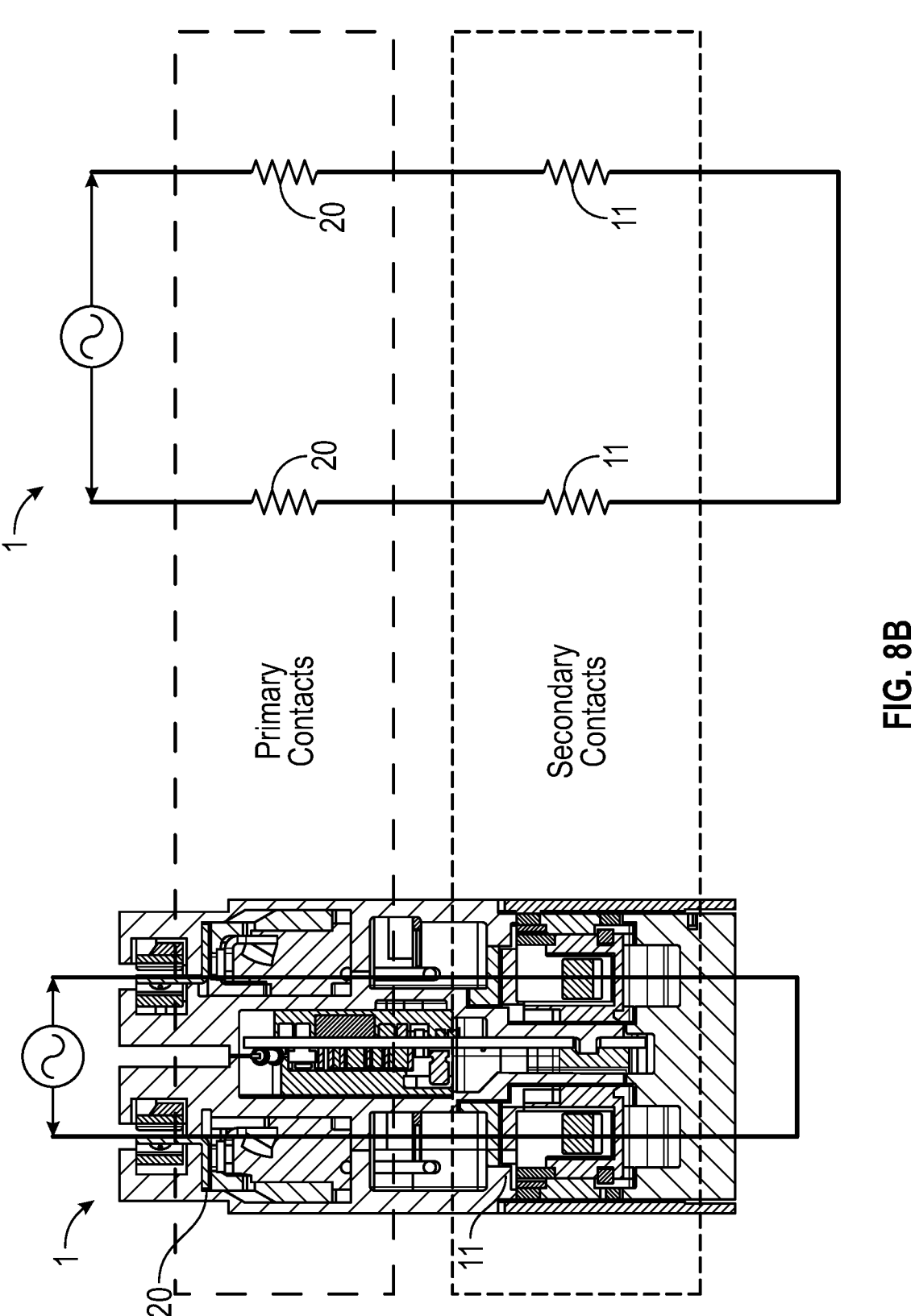

FIGS. 8A-B illustrate the remotely operated circuit interrupter 1 of FIGS. 1-3 and 6A-7 during a high interruption fault current event (e.g., without limitation, a short circuit). FIG. 8A depicts a top internal view of the remotely operated circuit interrupter 1. FIG. 8B illustrates a top cross-sectional view (left) of the remotely operated circuit interrupter 1 transversely cut through along line A-A and an equivalent circuit (right) thereof. During a high interruption fault current event, there is, e.g., without limitation, 240V and 10 kA available at the power source. Each arcing contact 20, 11 acts like a resistor in the circuit. The conventional remotely controlled circuit interrupters only open the primary separable contacts and keeps the secondary separable contacts closed during a fault event. As such, there is a less overall resistance in the conventional remotely controlled circuit interrupters as compared to that in the remotely operated circuit interrupter 1. Typically, the conventional remotely controlled circuit interrupters have peak circuit voltage measuring approximately 250V and peak let-through current around 7.5 kA. Since the fault current tolerant secondary switching mechanism 100 allows the secondary separable contacts 11 to fully open during a high interruption fault current event, it adds two more resistors to the circuit as compared to the conventional remotely operated circuit interrupters. It has been shown that the remotely operated circuit interrupter 1 has peak voltages consistently above 330V and peak let-through currents of approximately 5.7 kA. The energy that the fault current creates in a circuit interrupter is proportional to $I^2t$, where I is the fault current and t is time. If too much energy is built up in the remotely operated circuit interrupter 1, the circuit interrupter 1 will run a risk of fusing a conductor in the circuit or destroying the housing 8 and thus fail. The time component t for a high interruption fault current event will not change for a given fault event between the conventional remotely operated circuit interrupters and the inventive remotely operated circuit interrupter 1. However, the reduction in the let-through current has a non-linear reduction in energy that the remotely operated circuit interrupter 1 sees. This leads to a significantly less risk of conductor fusing or failed housings as compared to such risk of the conventional remotely operated circuit interrupters.

Figure 9A:
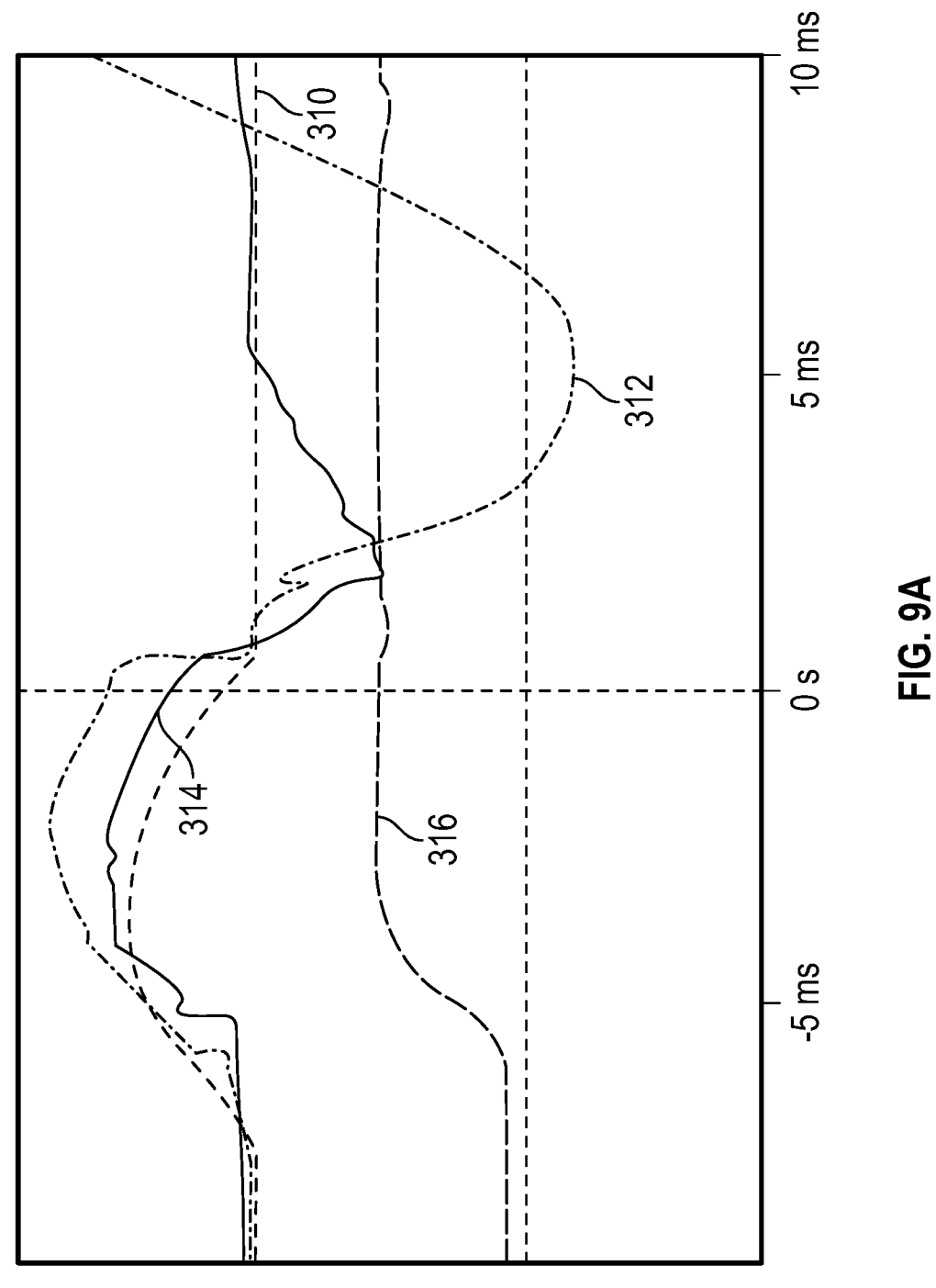
FIGS. 9A-B illustrate graphs of interruption traces within an exemplary remotely operated circuit interrupter during a high interruption fault current event in accordance with an example embodiment of the disclosed concept.
Figure 9B:
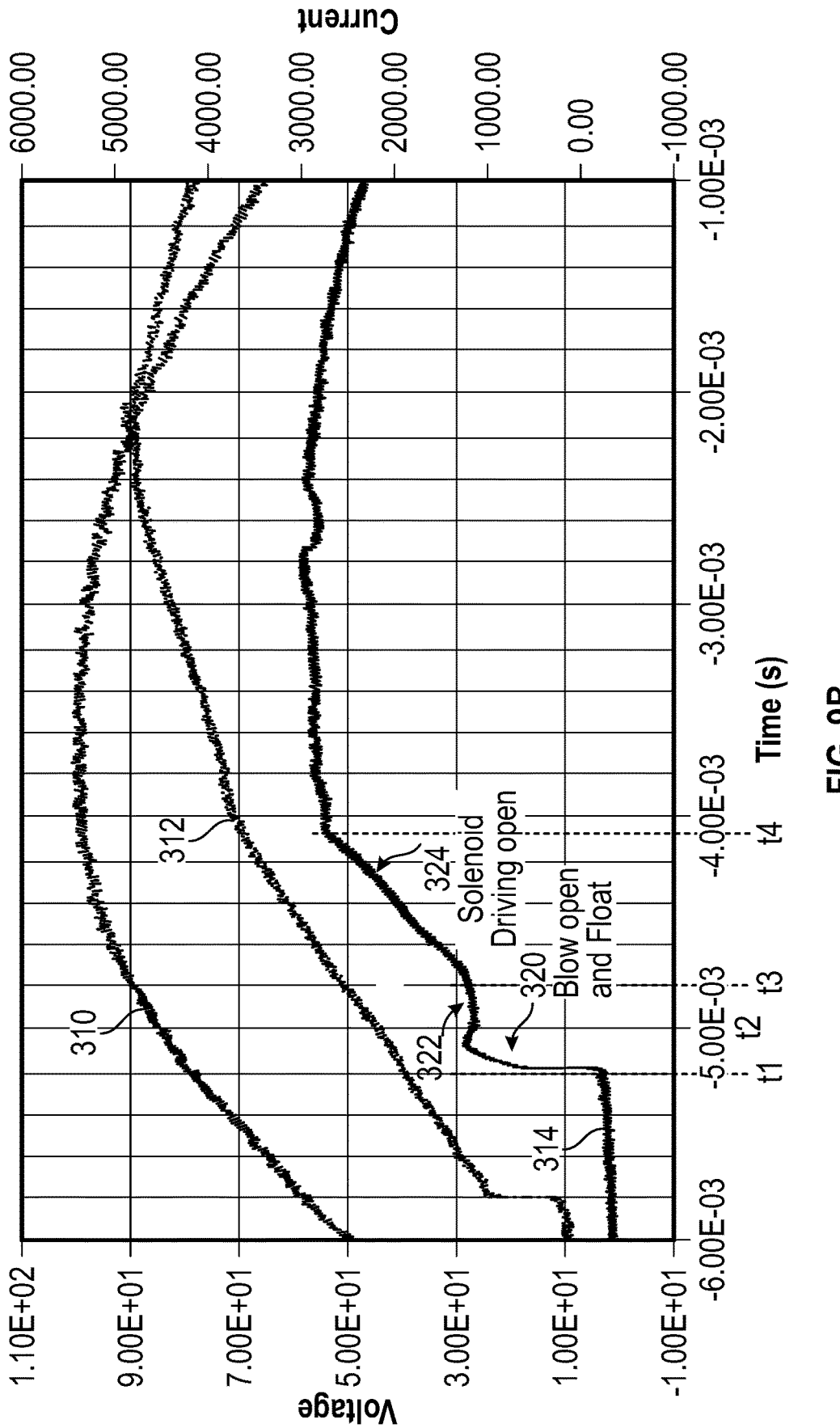

FIGS. 9A-B illustrate interruption traces in the remotely operated circuit interrupter 1 of FIGS. 1-3 and 6A-8B. FIG. 9A shows signal 310 depicting a let-through current (fault current) over time, signal 312 depicting an arc voltage across primary separable contacts 20 over time, signal 314 depicting an arc voltage across secondary separable contacts 11 over time, and signal 316 depicting current going through the solenoid 50 in order to fully open the secondary separable contacts 11. These signals 310, 312, 314, 316 show the sequential opening of the primary separable contacts 20 and then the secondary separable contacts 11. FIG. 9B shows that there is a short period in which the secondary separable contacts 11 blow open and float. Then, once a sufficient current is built up in the solenoid 50, the arc voltage will continue to rise, which indicates the secondary separable contacts 11 continue to separate. That is, from time t1 to time t2, the secondary separable contacts 11 separate as shown by the spike 320 in the arc voltage 314 across the secondary separable contacts 11. From time t2 to t3, the secondary separable contacts 11 float as shown by a brief plateau 322 in the arc voltage 314. From time t3 to time t4, there is another spike 324 in the arc voltage 314 as a result of the solenoid assistance. If there was no solenoid assistance, the secondary separable contacts 11 would just float and re-close at the current zero crossing. If the molten secondary separable contacts 11 reclose, a tack-weld would occur. Thus, the solenoid assistance helps to ensure the secondary separable contacts 11 are fully open and remain open until the fault is cleared, thereby protecting the secondary separable contacts from tack-welding or other damages.

Figure 10:
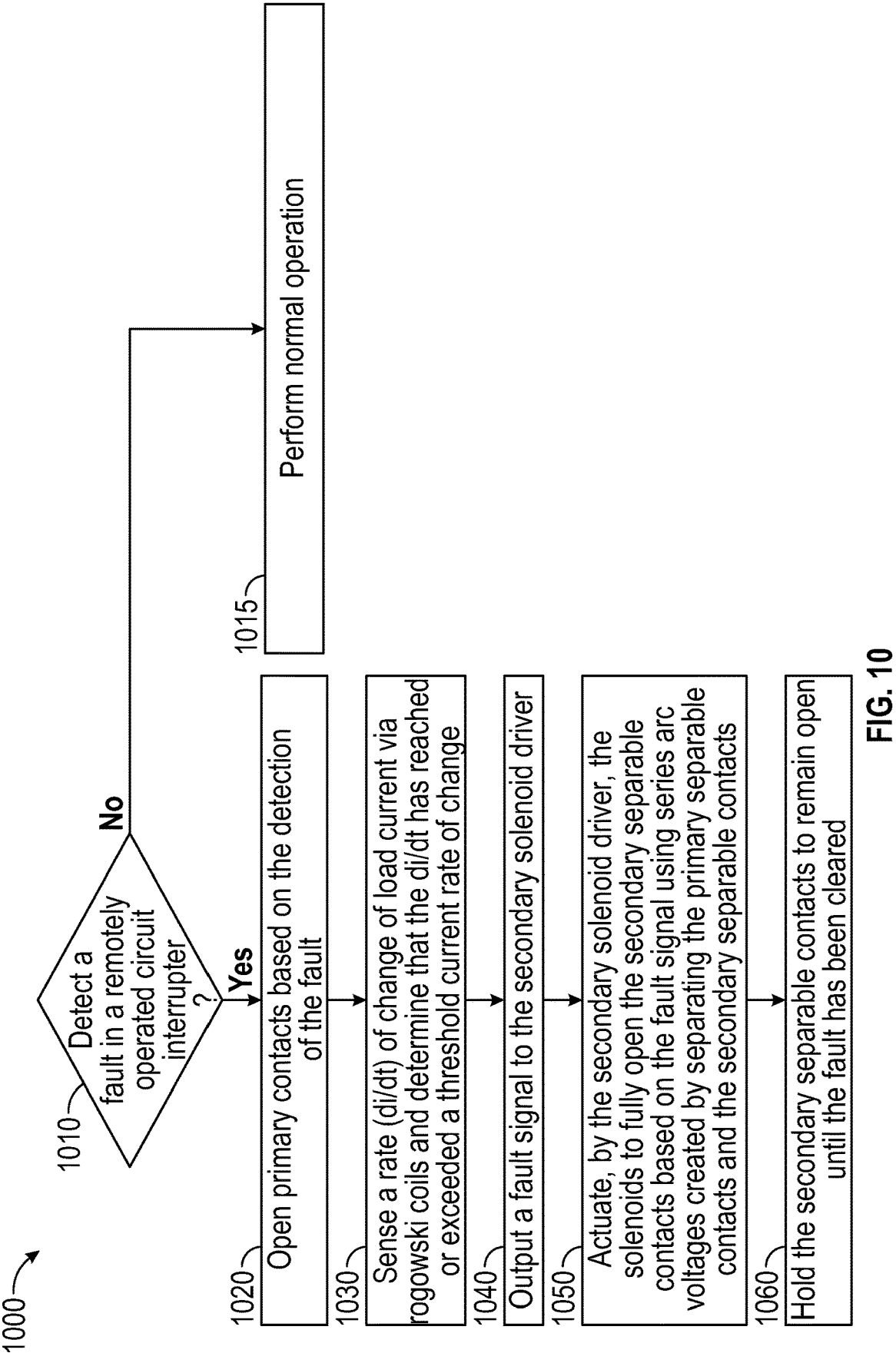
FIG. 10 is a flow chart of a method of interrupting current in an exemplary remotely operated circuit interrupter during an event of fault in accordance with an example embodiment of the disclosed concept.

FIG. 10 is a flow chart for a method 1000 of interrupting current in a remotely operated circuit interrupter according to a non-limiting, example embodiment of the disclosed concept. The method 1000 may be performed by the remotely operated circuit interrupter 1 of FIGS. 1-3 and 6A-8B or any components thereof.

At 1010, the remotely operated circuit interrupter determines if a fault has been detected. If no, at 1015 the remotely operated circuit interrupter performs normal operation. If yes, the method 1000 proceeds to 1020. The remotely operated circuit interrupter includes primary separable contacts and a fault current tolerant secondary switching mechanism including secondary separable contacts, one or more Rogowski coils, a di/dt measurement circuit, a secondary solenoid driver and one or more solenoids.

At 1020, the remotely operated circuit interrupter opens primary separable contacts based on the detection of the fault.

At 1030, one or more Rogowski coils continuously sense a rate (di/dt) of change of load current and a di/dt measurement circuit determines that the di/dt has reached or exceeded a threshold current rate of change.

At 1040, the di/dt measurement circuit outputs a fault signal to a secondary solenoid driver based on the determination.

At 1050, the secondary solenoid driver actuates one or more solenoids to fully open the secondary separable contacts based on the fault signal using series arc voltages created from separating of the primary separable contacts and the secondary separable contacts.

At 1060, permanent magnets in the one or more solenoids hold the secondary separable contacts to remain open until the fault has been cleared.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A remotely operated circuit interrupter structured to be connected between a power source and one or more loads, the remotely operated circuit interrupter comprising:
    primary separable contacts coupled to an operating mechanism and a thermal-magnetic trip device structured to interrupt current from flowing to the one or more loads by opening the primary separable contacts during a fault event; and
    a fault current tolerant secondary switching mechanism that includes secondary separable contacts coupled to the primary separable contacts in series, one or more Rogowski coils structured to continuously sense a rate (di/dt) of change of load current, a di/dt measurement circuit, a secondary solenoid driver and one or more solenoids, the di/dt measurement circuit being coupled to the one or more Rogowski coils and structured to receive a signal including the sensed di/dt, determine that the sensed di/dt has reached or exceeded a threshold current rate of change, and output a fault signal to the secondary solenoid driver based on the determination, the secondary solenoid driver being coupled to the di/dt measurement circuit and the one or more solenoids, the secondary solenoid driver being structured to actuate the one or more solenoids to fully open the secondary separable contacts based on the fault signal using series arc voltages of the primary separable contacts and the secondary separable contacts,
    wherein during the fault event, the fault current tolerant secondary switching mechanism protects the secondary separable contacts from tack-welding or damages by causing the secondary separable contacts to fully open and stay open until the fault event has been cleared, not by keeping the secondary separable contacts closed.

2. The circuit interrupter of claim 1, wherein the one or more solenoids are structured to hold the secondary separable contacts open via permanent magnets therein until the fault event has been cleared.

3. The circuit interrupter of claim 1, wherein the di/dt measurement circuit comprises a di/dt signal amplifier, an inverter/rectifier structured to condition and filter the signal including the sensed di/dt and a comparator structured to determine that the di/dt has reached or exceeded the threshold current rate of change and output the fault signal to the secondary solenoid driver based on the determination.

4. The circuit interrupter of claim 3, wherein the di/dt measurement circuit ensures that the remotely operated circuit interrupter does not react to inrush currents that occur with normal circuit breaker loads by filtering the sensed di/dt of each phase.

5. The circuit interrupter of claim 1, wherein the series arc voltages are based on two arcs in series per pole created from separating of the primary separable contacts and the secondary separable contacts, the series arc voltages having a larger voltage than arc voltage based on one arc per pole created from separating of only the primary separable contacts, the larger voltage resulting from increased resistance from the two arcs as compared to resistance from the one arc, the larger voltage ensuring fully opening the secondary separable contacts.

6. The circuit interrupter of claim 5, wherein the fault current tolerant secondary switching mechanism provides current limiting by increasing arc voltage based on the increased resistance from the two arcs and significantly reduces fault current that the remotely operated circuit interrupter needs to withstand from fault current that circuit interrupters opening only the primary separable contacts need to withstand.

7. The circuit interrupter of claim 6, wherein the current limiting prevents tack-welding of the secondary separable contacts, fusing of one or more conductors within the remotely operated circuit interrupter and destroying the housing of the remotely operated circuit interrupter.

8. The circuit interrupter of claim 1, wherein terminals for secondary moving arm and secondary stationary arm are structured to form a reverse current loop as the current passes the secondary separable contacts into the one or more loads, the terminals being structured to run parallel to each other when the secondary separable contacts are closed, the reverse current loop including a first current portion flowing outwardly via the terminal of the secondary moving arm and a second current portion flowing in parallel and opposite the first current portion via the terminal of the secondary stationary arm upon passing the secondary separable contacts.

9. The circuit interrupter of claim 8, wherein the reverse current loop assists in fully opening the secondary separable contacts by creating a magnetic force that propels outwardly an arc created from separating of the secondary separable contacts, the arc elongating while moving towards outer tips of the terminals, the elongation of the arc increasing arc resistance and driving up arc voltage.

10. The circuit interrupter of claim 1, wherein the remotely operated circuit interrupter comprises a housing, two laterally spaced-apart poles and a printed circuit board disposed therebetween, the printed circuit board comprising electrical components of the remotely operated circuit interrupter such that an additional separate frame for housing the electrical components is not needed.

11. The circuit interrupter of claim 10, wherein the printed circuit board comprises the di/dt measurement circuit, the secondary solenoid driver, a controller and a communication module communicatively coupled to a user device in a wired or wireless connection, the controller being structured to at least cause the secondary solenoid driver to actuate the one or more solenoids to open or close the secondary separable contacts based on a user input received from the user device via the communication module.

12. The circuit interrupter of claim 1, wherein the threshold current rate of change comprises 1,400 A peak at 60 Hz.

13. A method of interrupting current flowing in a remotely operated circuit interrupter structured to be connected between a power source and one or more loads, the remotely operated circuit interrupter having primary separable contacts and a fault current tolerant secondary switching mechanism including secondary separable contacts, one or more Rogowski coils, a di/dt measurement circuit, a secondary solenoid driver and one or more solenoids, the method comprising:

detecting a fault;

opening the primary separable contacts based on the detection of the fault;

continuously sensing a rate (di/dt) of change of load current by the one or more Rogowski coils and determining, by the di/dt measurement circuit, that the di/dt has reached or exceeded a threshold current rate of change;

outputting, by the di/dt measurement circuit, a fault signal to the secondary solenoid driver based on the determination;

actuating, by the secondary solenoid driver, the one or more solenoids to fully open the secondary separable contacts based on the fault signal using series arc voltages created by the primary separable contacts and the secondary separable contacts;

filtering, by the di/dt measurement circuit, the sensed di/dt of each phase; and ensuring that the remotely operated circuit interrupter does not react to inrush currents that occur with normal circuit breaker loads based on the filtering.

14. The method of claim 13, further comprising:

holding, by permanent magnets in the one or more solenoids, the secondary separable contacts to remain open until the fault has been cleared.

15. The method of claim 13, further comprising:

providing current limiting by increasing arc voltage based on increased arc resistance as a result of two arcs in series per pole, as compared to arc resistance resulting from one arc per pole in circuit interrupters that open primary separable contacts without also opening secondary separable contacts therein.

16. The method of claim 13, further comprising:

forming a reverse current loop as current passes the secondary separable contacts into the one or more loads, the reverse current loop including a first current portion flowing outwardly via a terminal of a secondary moving arm and a second current portion flowing in parallel and opposite the first current portion via a terminal of a secondary stationary arm upon passing the secondary separable contacts.

17. The method of claim 16, further comprising:

creating, by the reverse current loop, a magnetic force that propels outwardly an arc created from separating of the secondary separable contacts;

causing, by the reverse current loop, the arc to move towards outer tips of the terminals and to elongate while moving towards the outer tips of the terminals; and increasing, by the elongated arc, arc resistance and driving up arc voltage.

18. The method of claim 13, wherein the series arc voltages are based on two arcs in series per pole created from separating of the primary separable contacts and the secondary separable contacts, the series arc voltages having a larger voltage than arc voltage based on one arc per pole created from separating of only the primary separable contacts, the larger voltage resulting from increased resistance from the two arcs as compared to resistance from the one arc, the larger voltage ensuring fully opening the secondary separable contacts.

\* \* \* \* \*